United States Patent [19]

Rubichon

[11] Patent Number: 5,292,157
[45] Date of Patent: Mar. 8, 1994

[54] DETACHABLE PUSH-IN CONNECTOR FOR SEMIRIGID PIPES

[75] Inventor: Michel Rubichon, Pommiers la Placette, France

[73] Assignee: A. Raymond & Cie, Grenoble-Cedex, France

[21] Appl. No.: 970,786

[22] Filed: Nov. 3, 1992

[30] Foreign Application Priority Data

Nov. 14, 1991 [DE] Fed. Rep. of Germany ....... 4137396

[51] Int. Cl.⁵ ............................................ F16L 37/12
[52] U.S. Cl. ..................................... 285/39; 285/308; 285/340
[58] Field of Search ................. 285/39, 308, 319, 340, 285/921, 330

[56] References Cited

U.S. PATENT DOCUMENTS

| | | | |
|---|---|---|---|
| 4,288,113 | 9/1981 | Saulnier | 285/340 |
| 4,712,810 | 12/1987 | Pozzi | 285/340 |
| 4,895,395 | 1/1990 | Ceriani | 285/39 |
| 4,919,457 | 4/1990 | Moretti | 285/39 |
| 4,927,185 | 5/1990 | McNaughton | 285/39 |
| 4,979,765 | 12/1990 | Bartholomew | 285/308 |
| 4,993,755 | 2/1991 | Johnston | 285/340 |
| 5,161,834 | 11/1992 | Norkey | 285/39 |

FOREIGN PATENT DOCUMENTS

| | | | |
|---|---|---|---|
| 3905722 | 7/1990 | Fed. Rep. of Germany | 285/308 |
| 234686 | 9/1989 | Japan | 285/308 |

*Primary Examiner*—Eric K. Nicholson
*Attorney, Agent, or Firm*—Finnegan, Henderson, Farabow, Garrett & Dunner

[57] ABSTRACT

A detachable push-in connector for semirigid pipes, consisting of housing (1) having a through hole (2) and a plurality of cavities increasing step-wise in size to receive a pipe (3), and a sealing ring (7). Sealing ring (7) is preceded, in the push-in direction of pipe (3), by a retaining ring (14) having inwardly projecting spring tongues (16) capable of opening out elastically and that is held in place by a supporting ring (17). Tongues (16) form a flat truncated cone whose tip points in in the push-in direction. Between retaining ring (14) and sealing ring (7) is a stop ring (9) having a conically bevelled inner portion in the region of spring tongues (16) to permit them to open out. A disconnecting ring (22) axially slidable relative to supporting ring (17) is disposed upstream of retaining ring (14) in the push-in direction and has a conical forward edge (23) for spreading out spring tongues (16) of retaining ring (14) when disconnecting ring (22) is pressed into housing (1). To prevent disconnecting ring (22) from being accidentally pressed in, the ring's rear edge (29) is recessed inwardly of the connector and the outer edge (30) of supporting ring (17).

4 Claims, 2 Drawing Sheets ures 5,292,157

DETACHABLE PUSH-IN CONNECTOR FOR SEMIRIGID PIPES

BACKGROUND OF THE INVENTION

This invention relates to a detachable or releasable push-in or plug type connector for semirigid pipes of hard-elastic plastic material, such as for example, for the supply lines of motor vehicles. Such push-in connectors are known for example, from U.S. Pat. No. 4,919,457.

In this type of plug-in connector, a disconnecting ring part of the connector projects axially out of the housing and, for the purpose of pressing it into release the pipe, has an annular outer contact surface that extends completely around it and is readily accessible from the outside. Although the push-in connector can thus easily be disconnected by hand or with a simple tool, there is the risk of the pipe being accidentally disconnected from the push-in connector if, for instance during repair work or during assembly of the motor vehicle, a mechanic inadvertently strikes the contact surface of the ring with a tool so that the spring tongues of the retaining ring part of the connector are momentarily opened. If the pipe is at the same time also under tension, it is entirely possible for it to be pulled out from the connector or at least from a sealed position, so that it is no longer leaktight or is even completely broken.

An object of the present invention therefore is to improve the above-mentioned push-in connector so that it is impossible for the disconnecting ring to be accidentally pressed in and thus for the pipe to be unintentionally pulled out of the connector.

SUMMARY OF THE INVENTION

To achieve these objects, the present invention provides a detachable push-in connector for semirigid pipes comprising a housing having a through hole for the passage of a fluid, a plurality of cavities therein increasing in size for receiving connecting parts and an entrance end through which a piece of pipe to be connected is pushed into the connector, a shoulder of a first and smallest cavity located farthest from the entrance end serving as a stop for the pipe, a shoulder of a second larger cavity between the first cavity and said entrance end serving as a stop for an elastic sealing ring, the sealing ring having an inside diameter less than the outer diameter of the pipe and be preceded in the push-in direction of the pipe by a retaining ring having inwardly projecting spring tongues, said tongues forming a flat truncated cone, the apex of which points inwardly and in said push-in direction, the internal diameter of the tips of the tongues being less than the outer diameter of the pipe and adapted to grip said pipe and hold it in said connector, said tips being capable of opening out elastically, a stop ring between said sealing ring and said retaining ring, said retaining ring resting on an end of said stop ring opposite from said sealing ring, said end of the stop ring having a bevelled portion adjacent said spring tongues to permit and limit outward movement of said tongues, a supporting ring located in a third larger cavity preceding the retaining ring in the push-in direction, means for holding said supporting ring against axial movement in said third cavity and a disconnecting ring axially slidable relative to and internally of said supporting ring and preceding said retaining ring in the push in direction, said disconnecting ring having a forward facing conical edge for pushing outward said spring tongues when it is pushed forward relative to the supporting ring in the push-in direction and a rearward edge that is recessed inwardly of the outermost portion of said connector at the entrance end of said housing.

BRIEF DESCRIPTION OF THE DRAWINGS

Further objects and advantages will be apparent from the following description of an embodiment of the invention described more fully below and illustrated in the drawings, in which.

DETAILED DESCRIPTION OF THE INVENTION

Figure 1:
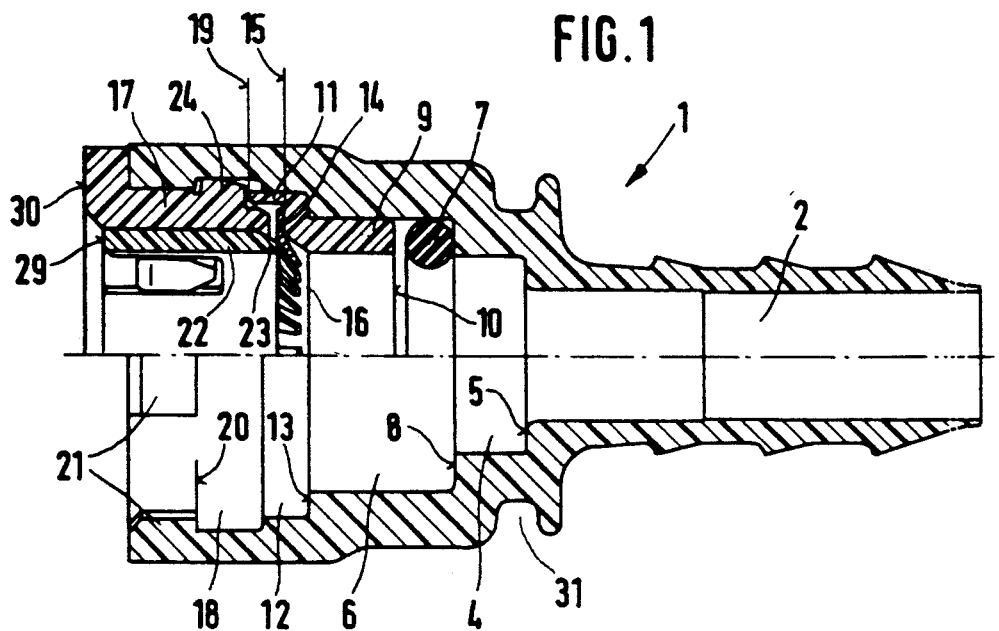
FIG. 1 is a longitudinal sectional view through the push-in connector housing, with the connecting parts of the connector shown only in the top half of the housing.

The push-in connector shown in the drawings consists of a housing 1 having a through hole 2 for the medium flowing through it and a plurality of cavities 4, 6, 12 and 18 increasing, step-wise, in diameter to receive a semirigid pipe 3 of hard-elastic plastic material and to hold the connecting parts of the connector that are described in more detail below.

The first cavity 4 corresponds in inside diameter to the outside diameter of the pipe 3 and at its inner end has a shoulder 5 serving as a stop for the pipe 3 inserted into housing 1 from the left side thereby limiting the pipe's depth of penetration.

A second larger cavity 6 holds a sealing ring 7 of rubber-like material, its inside diameter being slightly smaller than the outside diameter of the pipe 3. Cavity 6 is bounded in the axial direction at one end by a shoulder 8 and at the other end by an end face 10 of a stop ring 9 whose inside diameter likewise corresponds to the outside diameter of the pipe 3, while its outside diameter corresponds to the inside diameter of the second cavity 6. Cavity 6 thus limits axial movement of sealing ring 7.

Stop ring 9 has a radially outwardly and rearwardly extending annular flange 11 that projects into a third enlarged cavity 12 and is shaped so that it bears firmly against a shoulder 13 between cavity 12 and cavity 6. A retaining ring 14 is located in the annular flange 11 of stop ring 9, the outer portion of which bears against a shoulder 15 of stop ring 9 and which has obliquely, inwardly projecting spring tongues 16 that form a flat truncated cone whose apex points inwardly and in the push-in direction of the pipe and that are capable of opening out elastically. Stop ring 9 has a correspondingly conically bevelled portion in the region of spring tongues 16 to permit them to open outwardly and to limit their extent of movement.

Figure 2:
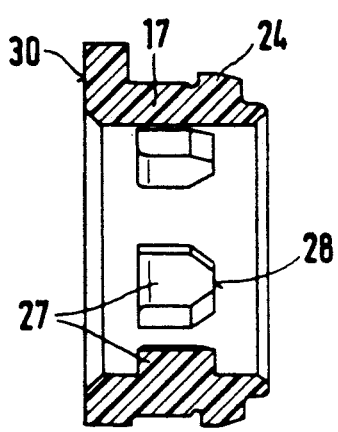
FIG. 2 is a longitudinal sectional view, taken along the line II—II of FIG. 3, of a supporting ring for guiding the disconnecting ring.
Figure 3:
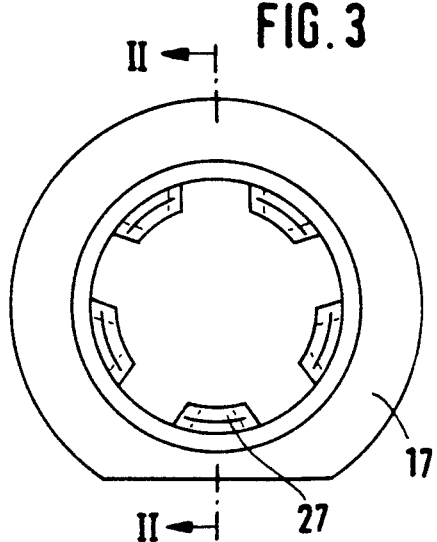
FIG. 3 is a plan view of the supporting ring.

The outer portion of retaining ring 14 is held with a slight axial clearance between shoulder 15 on stop ring 9 and a supporting ring 17 (FIGS. 2 and 3). Ring 17 has means for limiting its axial movement such as an integral outer ring 24 in the form of a flange-like shoulder that extends into an even larger cavity 18 further back in housing 1. Cavity 18 is located between rear end face 19 of annular flange 11 and the stop surfaces 20 of four inwardly directed, hook-shaped projections 21, forming inwardly directed shoulders, that are uniformly distributed around the inner periphery of the entrance end of housing 1. The inside diameter of projections 21 is at least equal to the inside diameter of cavity 12, so that the annular flange 11 of stop ring 9 can be passed without difficulty through to cavity 12 during assembly.

Figure 4:
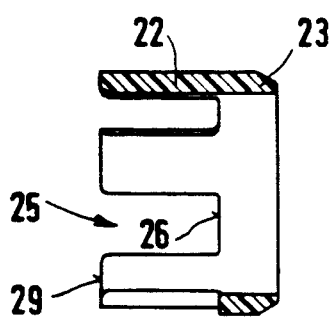
FIG. 4 is a longitudinal sectional view, taken on the line IV—IV of FIG. 5, of a disconnecting ring having guide slots.
Figure 5:
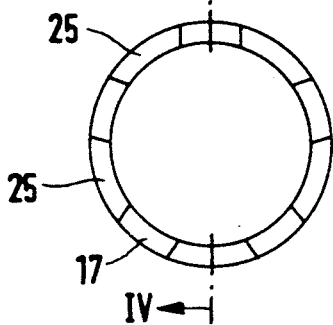
FIG. 5 is a plan view of the disconnecting ring.

A disconnecting ring 22 (FIGS. 4 and 5) is guided for axial sliding in supporting ring 17. Its front end 23 (in the push-in direction) points conically inwards and extends to a point slightly short of the spring tongues 16 of retaining ring 14. When disconnecting ring 22 is pressed in in the push-in direction, spring tongues 16 of retaining ring 14 open outwardly and thereby become disengaged from the outer surface of pipe 3, so that the latter can be pulled back out of the connector.

Disconnecting ring 22 has, distributed around its periphery, a plurality of axially parallel slots 25, that are open towards the ring's rear edge 29 and that end, short of the conical front or spreader edge 23, in stop surfaces 26. Radially inwardly extending projections 27, corresponding to the number and width of the slots 25, are provided with stop surfaces 28 on the inner wall of supporting ring 17 that penetrate into the slots of ring 22 when the two parts are joined together, so that disconnecting ring 22 is guided for axial sliding in supporting ring 17, but is prevented from passing out of the supporting ring 17 by the stop surfaces 28 of projections 27 acting against stop surfaces 26.

Disconnecting ring 22 has a length such that its rear edge or rear end face 29 (in the push-in direction) ends short of the rear edge 30 of the supporting ring 17 and is thus recessed in the push-in connector. This ensures that disconnecting ring 22 cannot be unintentionally pressed in by the action of an external force.

Figure 7:
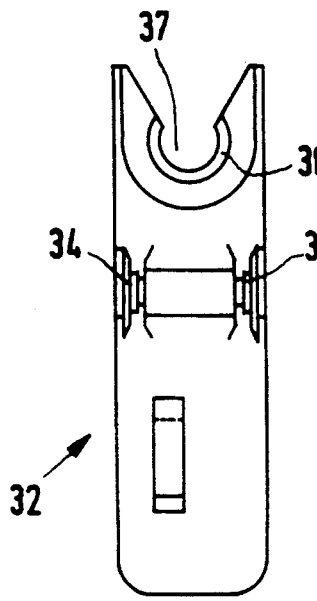
FIG. 7 shows the left-hand lever of the pliers in plan view from the inside.
Figure 6:
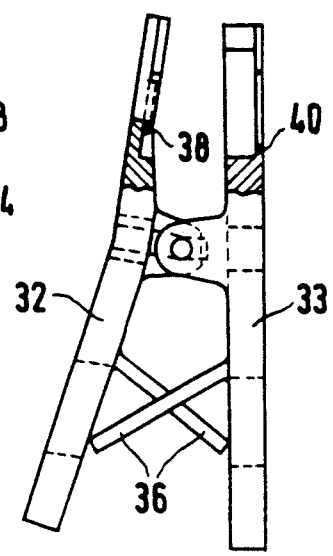
FIG. 6 is a side view of disconnection pliers for disconnecting the connector.
Figure 8:
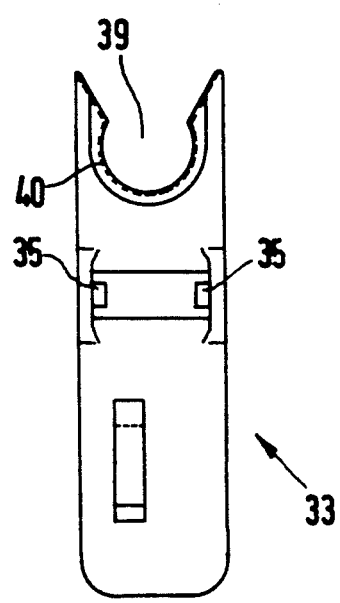
FIG. 8 shows the right-hand lever of the pliers in plan view from the inside.

To disconnect the push-in connector, a special pliers-like tool is required, of which a simple, expedient version is illustrated in FIGS. 6 to 8.

This disconnection pliers may advantageously be made of hard-elastic plastic material and consists of two levers 32 and 33, pivotally joined together approximately in their mid regions by interengaging joint fittings 34 and 35.

Elastically bendable arms 36 are provided at the operating end of levers 32 and 33 on their mutually facing inner sides, each of the arms at its free end bearing against the opposite inner side of the other lever so as to urge the levers apart and the pliers into a gripping position.

At the gripping end, the plier's lever 32, shown on the left side in the drawing, is provided with a cutout 37 sized to the diameter of the pipe 3 and having a funnel-shaped inlet opening.

This cutout 37 embraces pipe 3 over an angle of from about 240 to 270 degrees, and over an arc of appropriate length has a strip-like projection 38, the wall thickness of which corresponds to the thickness of rear edge 29 of disconnecting ring 22.

The other plier's lever 33 likewise has a cutout 39 in the shape of an arc with a funnel-shaped inlet opening and also has a collar 40 that can be inserted into a groove 31 provided on the outside of housing 1.

Figure 9:
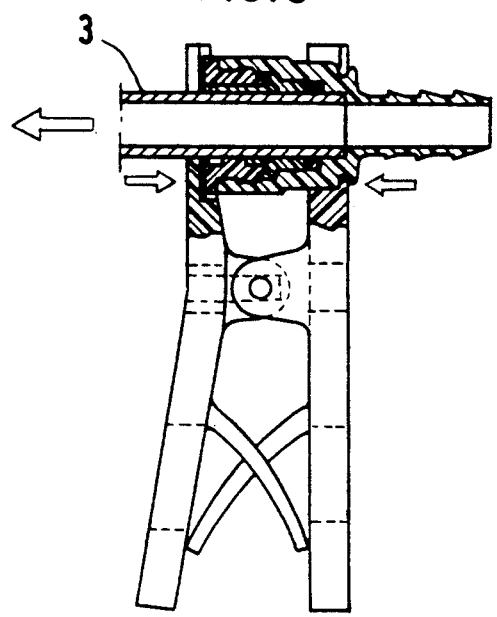
FIG. 9 shows the push-in connector with a piece of supply pipe inserted into it and with the disconnection pliers attached for disconnecting the connector.

To remove detach a supply pipe 3 inserted into the push-in connector, the disconnection pliers is first compressed against the spring force of the bendable arms 36 and then, as shown in FIG. 9, attached to the push-in connector.

Collar 40 is, for this purpose, pushed into the groove 31 in housing 1, while at the same time cutout 37 is pressed over the pipe 3 until strip-like projection 38 lies in front of the edge 29 of disconnecting ring 22. Pressure on the plier's levers 32 and 33 is then released so that projection 38, pressing against disconnecting ring 22 through the restoring spring force of the arms 36, will press forward the conical edge 23 of ring 22 and open out retaining tongues 16 of ring 14. The tips of the retaining tongues 16 are thereby disengaged from the surface of pipe 3, so that it can be easily pulled out of the connector.

In accordance with its angle of wrap of from 240 to 270 degrees, the wrapping length of strip-like projection 38 is made such that, when there are five edge regions 29 on disconnecting ring 22 between the four slots 25, at least three edge regions 29 will be engaged so that the disconnecting ring 22 will be pressed in axially to release the pipe.

We claim:

1. A detachable push-in connector for semi-rigid pipes comprising a housing having an axis and an axially oriented through hole for the passage of a fluid, a plurality of cavities therein increasing in size for receiving connecting parts and an entrance end through which a piece of pipe to be connected is pushed into the connector, a shoulder of a first and smallest cavity located the farthest from the entrance end serving as a stop for the pipe, a shoulder of a second larger cavity between the first cavity and said entrance end serving as a stop for an elastic sealing ring, the sealing ring having an inside diameter less than the outer diameter of the pipe and being preceded in the push-in direction of the pipe by a retaining ring having inwardly projecting spring tongues, said tongues forming a flat truncated cone, the apex of which points inwardly and in said push-in direction, the internal diameter of the tips of the tongues being less than the outer diameter of the pipe and adapted to grip said pipe and hold it in said connector, said tips being capable of opening out elastically, a stop ring between said sealing ring and said retaining ring, said retaining ring resting on and end of said stop ring opposite from said sealing ring, said end of the stop ring having a bevelled portion adjacent said spring tongues to permit and limit outward movement of said tongues, a supporting ring located in a third larger cavity preceding the retaining ring in the push-in direction, means for holding said supporting ring against axial movement in said third cavity and a disconnecting ring axially slidable relative to and internally of said supporting ring and preceding said retaining ring in the push-in direction, said disconnecting ring having a forward facing conical edge for pushing outward said spring tongues when it is pushed forward relative to the supporting ring in the push-in direction and a rearmost rear end face that extends substantially perpendicular to the axis of the connector and that is located axially inwardly of the rearmost portion of said connector at the entrance end of said housing.

2. The push-in connector of claim 1, wherein the rear end face of the disconnecting ring is located axially inwardly of an rear edge of said supporting ring.

3. The push-in connector of claim 2, wherein the disconnecting ring has a plurality of axially parallel slots distributed around its periphery that begin adjacent its rear end face and continue toward its forward edge ending short thereof to form stop surfaces, and a corresponding number of radially inwardly extending projections around the inner side of the supporting ring that cooperate with said slots to prevent relative rotation between said disconnecting ring and supporting ring and to prevent said disconnecting ring from passing axially out of said housing.

4. The push-in connector of claim 3, wherein the means for holding the supporting ring against axial movement comprises a fourth cavity larger than said third cavity and a shoulder on the outer side of said supporting ring that extends into said fourth cavity.

* * * * *